INVENTORS.
RONALD C. KOWALSKI,
JOHN W. HARRISON,
JOHN C. STATON,
JAMES P. KELLER,
BY
ATTORNEY.

United States Patent Office 3,551,943
Patented Jan. 5, 1971

3,551,943
CONTROLLED DEGRADATION
John C. Staton, James P. Keller, and Ronald C. Kowalski, Baytown, and John W. Harrison, Westfield, Tex., assignors to Esso Research and Engineering Company
Filed Dec. 19, 1966, Ser. No. 602,676
Int. Cl. B29f 3/08
U.S. Cl. 18—2                                        5 Claims

ABSTRACT OF THE DISCLOSURE

A system for the controlled scission of polypropylene comprises an extruder-reactor, means for measuring a parameter of molecular weight of polypropylene after passing through the extruder-reactor, and feedback means for changing the conditions in the extruder-reactor in response to the parameter of molecular weight measured. This system may contain a pelletizer and a continuous rheometer which measures the parameter of molecular weight of the pelletized polypropylene.

---

The present invention is directed to a process and system for the controlled scission of thermoplastic polymer. More specifically, the process is directed to producing in a reproducible, predictable, and controllable manner a thermoplastic polymer such as polypropylene having a desired weight average molecular weight and molecular weight distribution. In its more specific aspects, the invention is directed to a system for the controlled scission of polypropylene which comprises an extruder-reactor, means for measuring a parameter of molecular weight of polypropylene after passing through the extruder-reactor and feedback means for changing the conditions in the extruder-reactor in response to the parameter of molecular weight measured.

The polymerization of propylene with a Ziegler-type catalyst, for example, titanium trichloride and triethyl aluminum, to produce polypropylene is known. A particularly suitable catalyst and process for producing polypropylene is disclosed in U.S. 3,032,510 wherein, for example, a co-crystallized titanium chloride-aluminum chloride is mixed with an aluminum alkyl compound. In the known processes for making polypropylene, molecular weight is controlled by the use of chain terminators or transfer agents such as hydrogen. Thus, whether the process is continuous or batch, changes are necessary in the condition utilized in the process or in the amount or nature of the chain terminator or transfer agent to produce polypropylene having different weight average molecular weights. Further in these known processes, the molecular weight distribution of the polypropylene made is not controlled but is merely dependent on the conditions utilized to control the weight average molecular weight. It has been found that various levels of molecular weight of polypropylene are necessary to be able to supply the various end uses for this thermoplastic polymer. Further the processing of polypropylene made according to the processes that are known is difficult since high temperatures, low throughputs, and special procedures are often required.

It has been found according to the present invention that the molecular weight distribution of polypropylene can be controlled. The control of molecular weight distribution results in polypropylene which has unique characteristics.

By the process of the present invention, a lower level of melt elasticity is obtained which makes the polypropylene particularly suitable for processing and improves the processability of the polypropylene in the production of film and the melt spinning of fibers. The lack of strain in the melt state, contrasted to previously available polypropylene, eliminates the cause of many fiber breakages and also permits a much higher level of elongation in a subsequent cold-drawing operation, resulting in significantly higher levels of tenacity in the finished product. Likewise, the processing of polypropylene made in accordance with this invention makes a far superior fiber in that it can be drawn to a higher degree and the fiber process can be run at lower temperatures.

Another problem which is encountered in the continuous polymerization process is obtaining uniform molecular weight polypropylene product at a desired molecular weight level. Heretofore, blending has been an essential part of making products, and inherent in the usual blending techniques is the difficulty of producing a uniform product which is reproducible. In the blending operation, extrusion equipment has been used solely for melting and dispersing the blended materials. However, the blend has the inherent difficiencies of a mixture of the two or more distinct weight average molecular weight materials which are difficult to reproduce, may be non-uniform and may have a varying molecular weight distribution.

Extrusion equipment is commonly used for the conversion of polymeric materials from one physical form to another. During an extrusion process, the thermoplastic polymer may be degraded under some conditions to a lower level of weight average molecular weight. However, the molecular degradation or scission of the polymer which normally occurs in extrusion equipment is usually considered deleterious, is not precisely controlled, nor is the normal operation such that degradation is allowed to occur over extensive ranges of molecular weight such that a lower level of molecular weight is the desired objective of the operation. According to the present invention, a system is provided whereby the controlled scission of polypropylene is the desired objective. The system comprises preferably an extruder-reactor and means for continuously monitoring a parameter of the molecular weight of polypropylene passing through the extruder-reactor.

It is therefore an object of the present invention to produce in a reproducible, predictable, and controllable manner a thermoplastic polymer such as polypropylene having a desired weight average molecular weight.

Another object is to produce polypropylene having a desired weight average molecular weight and a desired molecular weight distribution.

Another object of this invention is to provide a system for the controlled scission of polypropylene.

Still another object is to provide a system which utilizes an extruder-reactor along with a continuous rheometer which will continually monitor the melt viscosity of the extruded polypropylene.

Other objects and aspects of the present invention are more fully set forth in the following description and drawings wherein.

Figure 1:
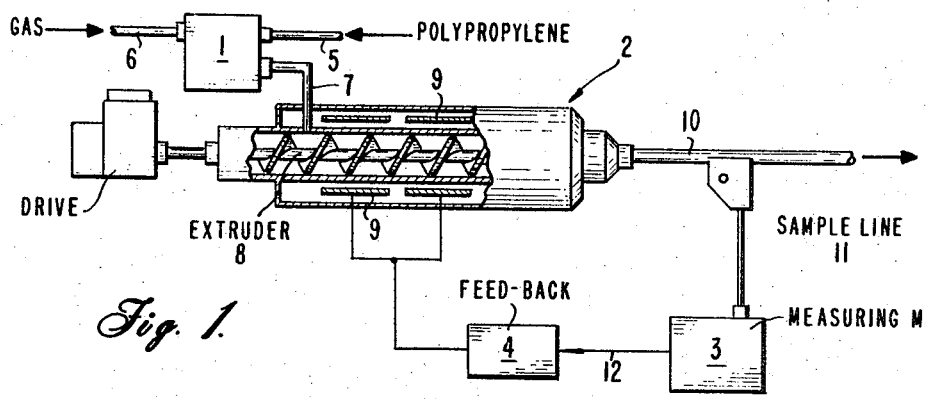
FIG. 1 is a schematic diagram of a system for the controlled scission of a thermoplastic polymer.

Referring to FIG. 1, the system of the present invention may be schematically shown as the combination of a mixing means 1 for mixing an oxygen-containing gas with the polypropylene; a reactor means 2 for heating the thermoplastic polymer under shear; and measuring means 3 for measuring a parameter of molecular weight of the polymer; and feedback means 4 for changing the conditions in the reactor means 2 in response to the parameter of molecular weight measured by the measuring means 3. More specifically, polypropylene may be added to mixing means 1 by line 5 and air or an oxygen-containing gas by line 6 which after being admixed are passed to reactor means 2 by line 7. The reactor means 2 will admix the polypropylene and air under shear by means of a screw 8 while being heated by heating means 9. The reactor means 2 may have cooling means (not shown) at the outlet end whereby the polypropylene is extruded through a die (not shown) and out product line 10. From the product line 10 a sample is taken through line 11 to the measuring means 3 which may be a continuous rheometer which continuously measures the melt viscosity of the polypropylene. The melt viscosity is recorded on feedback means 4 which may be a recorder-controller which takes the signal from the measuring means 3 by line 12 and compares it with a desired melt viscosity and controls the heaters 9 in the reactor means. The conditions in the reactor means 2 may also be changed by changing the back pressure on screw 8, the speed of the screw 8 or the addition of oxygen. The temperature of the heaters are controlled so as to enable the molecular weight of the polypropylene to be controlled within very narrow limits.

Figure 2A:
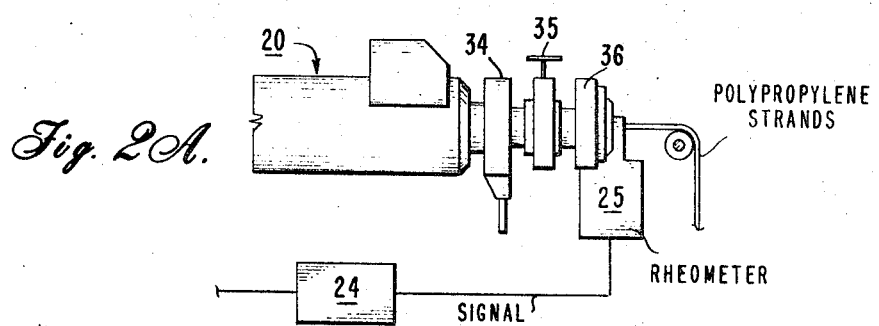
FIG. 2A is an illustration of a continuous rheometer mounted on the die head of the extruder-reactor.
Figure 2:
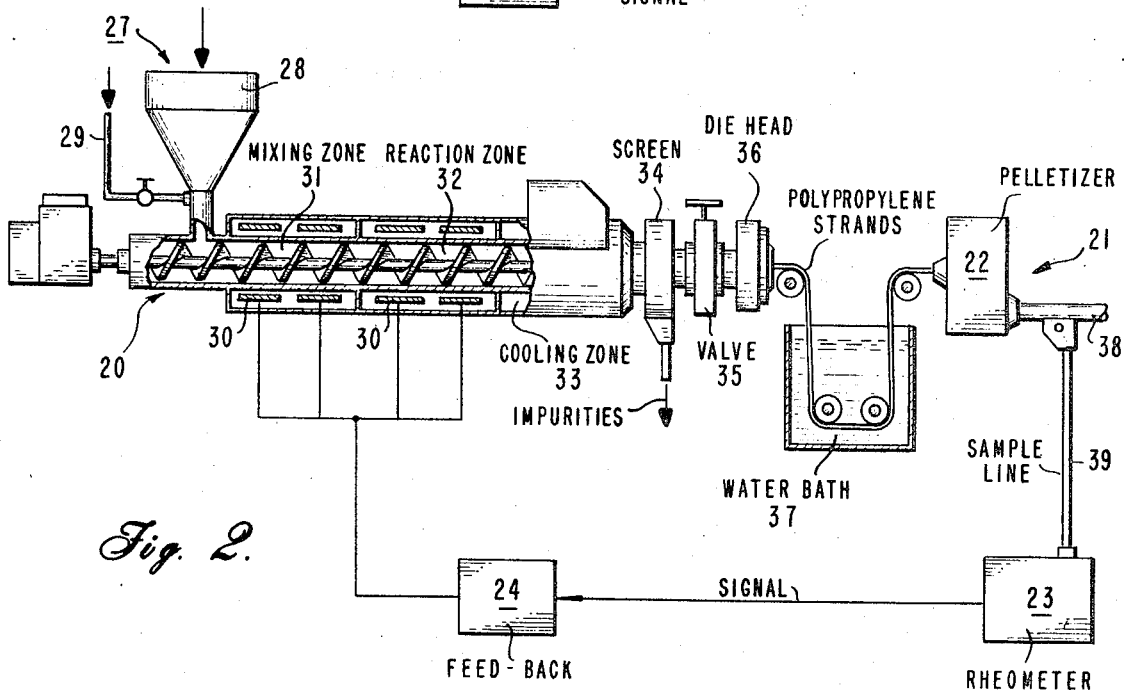
FIG. 2 is a preferred system of the present invention suitable for the controlled scission of polypropylene.

The preferred system for the controlled scission of polypropylene is set forth in FIG. 2. The system comprises an extruder-reactor 20; a sampling means 21 which preferably comprises a pelletizer 22 and a continuous rheometer 23 which measures a parameter of molecular weight; and feedback means 24 which may be a recorder-controller which controls the conditions in the extruder-reactor 20 in response to the parameter of molecular weight measured in the continuous rheometer 23. Instead of sampling means 21 wherein pellets of polypropylene are sampled and the continuous rheometer 23 which measures the melt viscosity utilizing the polypropylene pellets, a sampling means 25 which comprises a continuous rheometer of a type which can be attached directly to the die head of the extruder-reactor 20 to measure the melt viscosity of the extruded polypropylene may be used. (FIG. 2A).

The extruder-reactor 20 is a modified extruder 26 having a mixing chamber 27 which comprises a hopper 28 and a line 29 by which air or an oxygen-containing gas may be introduced with the polypropylene. The line 29 may be positioned in the hopper 28 or in the extruder 26 wherein air or the oxygen-containing gas is introduced for admixture with the propylene. The extruder 26 has a plurality of heaters 30 through its length, although the heating capacity at the inlet end is greater than in the usual extruder. The extruder 26 may be considered to have three distinct zones: a mixing zone 31; a reaction zone 32; and a cooling zone 33. Further, the extruder 26 may be provided with a screen pack 34 or other filtering device which removes large particles or impurities from the melt. Likewise, the extruder 26 is provided with a back-pressure valve 35 which controls the pressure in the extruder 26. The polypropylene is passed through the extruder-reactor 20 and out the die head 36 wherein the polypropylene passes as a plurality of strands into a water bath 37 and then to a pelletizer 22. The pelletizer 22 comprises a simple cutting means for cutting the strands into pellets. A continuous supply of pellets is obtained through line 38 from which a sample is obtained by line 39. The sample of pellets from line 39 is passed to the continuous rheometer 23. The continuous rheometer 23 comprises means for heating the pellets to a specified temperature and passing them through a die of known configuration and under a known shear stress or shear rate for determining the melt viscosity of the polypropylene at the specified temperature. The melt viscosity is recorded on the feedback means 24 and is compared to the desired melt viscosity which is correlated directly to the weight average molecular weight. In the event that the measured melt viscosity of the polypropylene is below the desired melt viscosity, this indicates that the molecular weight of the polypropylene is below that desired and the feedback means 24 automatically changes the conditions in the extruder-reactor 20 such as reducing the temperature in the extruder-reactor 20 by cutting back on the temperature settings of heaters 30. In the event that the measured melt viscosity of the polypropylene is above the desired melt viscosity indicating that the molecular weight of the produced polypropylene is above that desired, the feedback means 24 would change conditions in the extruder-reactor 20 such as by raising the temperature in the extruder-reactor 20 by increasing the temperature settings of the heaters 30.

In the operation of the extruder-reactor 20 of the present invention, one third to one half of the length of the extruder-reactor measured from the feedend is maintained at extremely high and controlled temperatures. The remaining half or two thirds of the extruder-reactor may require a small amount of cooling capacity. The cooling may be obtained either by means of the blowers associated with the heaters 30 when the heaters themselves are off or by some other suitable means at the extrusion end of the extruder-reactor. It is thus emphasized that a temperature profile for the polypropylene as it passes through the extruder-reactor 20 of the present invention is very different from the temperature profile of materials which are passed through extruders in the normal operation. A normal temperature profile would be a curve starting at the temperature of the material at its introduction and approaching the melt temperature at the die. Such a temperature profile is obtained because the temperature of the metal of the extruder is maintained fairly uniform throughout the device. In the system of the present invention, it is unique to provide heating in the mixing and reaction zones 31 and 32 of the polypropylene to temperatures substantially above any known used in extrusion processes heretofore. It is necessary that the polypropylene be cooled when the polypropylene is extruded as strands since strands of polypropylene cannot be handled at the extremely high temperatures used in the feedend of the extruder-reactor 20. The polypropylene is cooled to temperatures below about 620° F. and preferably below 600° F. at the die so that the strands may be handled since the strength of any strand at these temperatures has been found to be marginal at 620° F. Thus the use of very high temperatures in the feedend of the extruder-reactor 20 while using no heat and sometimes cooling in the extrusion end of the extruder-reactor is part of the present process for producing in a reproducible, predictable, and controllable manner a polypropylene product having the desired weight average molecular weight and molecular weight distribution.

It is to be understood that various modifications of the schematically disclosed system may be made such as by utilizing an underwater pelletizer or some other means for obtaining the polypropylene in the form of pellets. The continuous rheometer which is used is preferably a rheological instrument having a capillary die of a nominal length of 1.0 inch and length to diameter ratio of 16 and is operated to measure in terms of a constant shear rate of 1300 sec.$^{-1}$ and to have a residence time of 0.1 sec. However, a rheological instrument having other dimensions and operated at a different shear rate may be used.

A continuous rheometer which is mounted on the die head is considered to have certain disadvantages which a continuous rheometer measuring the melt flow characteristics of the pelletized polypropylene does not have. Since the temperature of the extruded polypropylene will vary, this means that melt viscosity is measured at varying temperatures and accordingly, a much more complex system is required. Further, there is the problem of determining the actual temperature of the polypropylene at the point of extrusion, and thus, the temperature under which the melt flow characteristics are measured in a continuous rheometer mounted on the die head is not constant.

The system of the present invention enables several processes to be accomplished depending on the specific system used and the desired result which is to be obtained. Broadly, the process of the present invention is a controlled closed-loop process wherein it has been found that product of reproducible and predictable molecular weight may be produced by continuously measuring the melt flow of the polypropylene product and utilizing this measurement to control the conditions in a reactor system. Basic to the processing techniques of the present invention is the finding that the degradation of polypropylene in the presence of oxygen follows a uniform and predictable path which is most influenced by temperature.

The process of the present invention comprises admixing a gas containing at least 7 mol percent oxygen with polypropylene in a reactor means; heating said polypropylene admixed with oxygen to a melt temperature in excess of 550° F.; expelling the polypropylene from the reactor means; measuring a parameter of molecular weight of the expelled polypropylene; and controlling the temperature at which the polypropylene is heated in response to the measured parameter of molecular weight.

The process of the present invention wherein the preferred extruder-reactor is used comprises contacting polypropylene with an oxygen-containing gas having at least 7 mol percent oxygen; heating the polypropylene admixed with oxygen to a melt temperature in excess of 550° F.; cooling the polypropylene to extrusion temperature which does not exceed 620° F.; extruding the polypropylene from the extruder-reactor; measuring a parameter of the molecular weight of the extruded polypropylene; and controlling the temperature at which the polypropylene is heated in response to the measured parameter of molecular weight. The pellets or powder of polypropylene which are introduced to the extruder-reactor of the present invention need only to pass through a gas having at least 7 mol percent oxygen. Air is preferred although oxygen cut back with an inert gas ($N_2$, $CO_2$, etc.) for safety reasons may be employed. The polypropylene is thus mixed in mixing zone 31 wherein the solid polypropylene pellets or powder are thoroughly admixed with the oxygen-containing gas. The polypropylene is then passed to the reaction zone 32 wherein the polypropylene is converted to a liquid and is maintained under shear and high temperature conditions in the presence of an oxygen-containing gas. In the reaction zone, the polypropylene is heated to a controlled melt temperature within the range of 550° to 900° F. The metal temperature of the extruder 26 in the mixing and reaction zones 31 and 32 is within the temperature range of 600° to 1,000° F. In the cooling zone 33, which occupies most of the extruder-reactor 20, the liquid polypropylene is pumped at reduced temperatures to the die head 36. The extent of the degradation in the extruder-reactor process of the present invention is controlled by controlling the mean temperature in the reaction zone by either the heaters 30 or the back pressure on the extruder screw by means of back-pressure valve 35. Since the oxygen-containing gas can remain in contact with the polypropylene only up to the reaction zone wherein the polypropylene becomes liquid and wherein the oxidative reaction will most likely occur when the oxygen-containing gas and polypropylene are in contact under shear and high temperature, it is the mean temperature in the reaction zone which primarily controls the total extent of the degradation of the polypropylene introduced to the extruder-reactor. The amount of oxygen added above 7 mol percent and the screw speed are small factors once a design has been chosen. The extent of degradation of the polypropylene in the process of the present invention may be substantial and is controllable and reproducible.

Not only can a uniform product having a desired weight average molecular weight be obtained, but the molecular weight distribution of polypropylene may be made narrower. Thus, the extent of the degradation of the polypropylene in the present invention may be substantial. The scission which occurs when the extent of degradation is substantial results in a much narrower molecular weight distribution of the polypropylene as evidenced by the reduction of the melt elasticity. Extremely low levels of melt elasticity (swell) may be obtained. However, it has been found that the solid state physical properties of the polypropylene subjected to substantial degradation are not affected. While chemical analysis of the degradation of polypropylene indicates an oxygen uptake in the magnitude of 100 p.p.m., the physical properties remain substantially unchanged whether moderate or extreme degradation had been carried out. For example, no change was found in the melting properties of the polypropylene produced according to the present invention, and the X-ray crystallinity data showed no effect on polymer crystallinity. The unique property of the polypropylene produced by the process of the present invention is its extremely low melt elasticity.

For the purpose of describing certain aspects of the present invention, the terms Swell and Shear Stress will be used. Both Swell and Shear Stress are commonly known terms, but as used herein when capitalized indicate that the numerical values associated therewith are associated with obtaining the values on a specific rheological instrument. The specific rheological instrument is a continuous rheometer having a capillary die of a nominal length of 1.0 inch and a length to diameter ratio of 16. The geometry and test conditions of such an instrument are such that the polymer has a 0.1 residence time at a constant shear rate of 1300 reciprocal seconds and a melt temperature of 450° F. Thus, the numerical values associated with Swell and Shear Stress are nothing more than stating that the values are obtained utilizing a rheological instrument of defined characteristics. The information obtained from such an instrument is pressure, flow-rate, and diameter of the solidified polymer extrudate. From these measurements and the geometry of the capillary die and the molten polymer density, Shear Stress ($\tau$), Shear Rate ($\theta$), and Swell $(d/d_0)_c^2$ are calculated. The relationship between Shear Stress and Shear Rate is given by Newton's Law of Viscosity:

$$\tau = \eta \theta$$

where $\eta$ = "apparent" viscosity $$\tau = \frac{(\Delta P) R}{2L}$$

$$\gamma = \frac{4Q}{\pi R^3}$$

$\Delta P$ = Pressure drop, p.s.i.
R = Die radius, inches
L = Die length, inches
Q = Volumetric flow rate, in.$^3$/sec.

The swell-shear stress relationship is given by the following equation:

$$(d/d_0)_c^2 = K + 1$$

where $d$ = Extrudate diameter, inches
$d_0$ = Die diameter, inches
$c$ = Correction for densification on cooling
K = Constant, function of molecular parameters By the foregoing, numerical values are utilized to describe and characterize polypropylene in terms of molecular weight (corresponding to Shear Stress) and molecular weight distribution (corresponding to Swell) by obtaining all data on a rheometer having defined characteristics. From the relationships set forth above, data can be obtained from varied conditions so as to characterize polyproylene in terms of viscosity and elasticity. However, such an approach would require comparing compositions of polypropylene as a family of curves. The comparison would be made wherein the viscosity data are plotted in terms of shear stress vs. shear rate and the elasticity data are plotted in terms of swell vs. swell stress. Accordingly, the use of Shear Stress and Swell with numerical values at a residence time of 0.1 sec. is nothing more than indicating the common condition at which the comparison of shear stress and swell is made, that being associated with a shear rate of 1300 sec.$^{-1}$ obtained on a specific rheometer. A rheological instrument having a structure and illustrating the characteristics to obtain data over varying conditions or at the specific condition used as the standard herein in terms of Shear Stress and Swell is fully described in U.S. 3,279,240. The polypropylene which is produced according to the present process could be equally characterized in terms of molecular weight distribution in terms of the ratio of weight average molecular weight: number average molecular weight ($\overline{M}_w/\overline{M}_n$).

The present invention will be further illustrated by the following specific examples which are given by way of illustration and not as limitations on the scope of the invention.

EXAMPLE I

Into a single screw extruder-reactor was fed a polypropylene powder having a Shear Stress ranging from 25.5 to 29.5 p.s.i. The powder was mixed thoroughly with air as it was introduced into the hopper of the extruder-reactor. The metal temperature of the extruder-reactor was stabilized at about 750° F. in the mixing zone, 700° F. in the reaction zone, and the metal temperature at the die was 400° F. The extruded polypropylene as it came out of the extruder-reactor was passed through a water bath and pelletized, and samples of the polypropylene pellets were passed to a continuous rheometer having a die of 0.0625 inch in diameter and 1.0 inch long. The polypropylene passing through the continuous rheometer at a 0.1 second residence time at a melt temperature of 450° F. was under a constant shear rate of 1300 reciprocal seconds. As the polypropylene passed through the continuous rheometer a continuous Shear Stress was recorded on a recorder controller. The Shear Stress which was continuously recorded was between 17.0 and 18.0 p.s.i.

EXAMPLE II

Into the same single screw extruder but not operated as an extruder-reactor was fed a blend of polypropylene powder obtained from two polypropylene materials ranging in Shear Stress between about 25.5 and 29.5 p.s.i. The blend of polypropylene before being fed into an extruder was thoroughly mixed utilizing a double-cone blender. The temperature of the extruder was stabilized at 450° F. (metal temperature), and no air or oxygen was added or admixed with the polypropylene powder. As this blend of polypropylene was extruded into the usual way that blends are worked up, there were no changes made in the conditions within the extruder. The Shear Stress which was recorded on a continuous basis was found to vary between 23.2 and 27.0 p.s.i.

Example I illustrates that by the process of the present invention a desired molecular weight polypropylene can be obtained continuously within a very narrow range of average molecular weight. Further by the process of the present invention, the narrowed range of average molecular weight can be easily duplicated. It is illustrated in Example II that even by attempting to obtain weld-mixed blends that a continuously uniform product cannot be obtained. Furthermore, such a product is difficult to reproduce since it is seen that there is a considerable spread in the Shear Stress even in a well-mixed blend. Thus by the process of the present invention, it is possible to eliminate the expensive step of pre- and post-extrusion blending equipment as well as eliminating the deficiencies of such a process for making a uniform and reproducible product.

The temperature conditions of the polypropylene as it passes through an extruder-reactor can be obtained experimentally to predict the desired conditions for producing a polypropylene having desired properties. These properties may be weight average molecular weight and/or molecular weight distribution. The following examples illustrate the characteristic degradation curve of a high molecular weight starting material and a low molecular weight polypropylene powder.

EXAMPLE III

A polypropylene powder having a melt flow rate of 0.94, Shear Stress of 35.5 p.s.i., and Swell of 14.5 admixed with oxygen was introduced to the extruder-reactor described in Example I. The metal temperatures in the extruder-reactor were adjusted and lined out to obtain various melt temperatures. When the temperatures were stabilized at any melt temperature the Shear Stress and Swell were measured. The results obtained are set forth in Table 1.

TABLE I

| Melt temperature | Shear stress (p.s.i.) | Swell |
|---|---|---|
| 450 | 24.6 | 8.8 |
| 500 | 22.7 | 6.5 |
| 550 | 21.2 | 4.8 |
| 640 | 16.8 | 3.4 |

EXAMPLE IV

Similarly as in Example III, a polypropylene powder having a melt flow of 4.1, Shear Stress of 21.6 p.s.i., and Swell of 13.7 was introduced into the extruder-reactor. The following data were obtained and is set forth in Table 2.

TABLE 2

| Melt temperature | Shear stress (p.s.i.) | Swell |
|---|---|---|
| 450 | 20.2 | 11.3 |
| 500 | 18.0 | 6.8 |
| 550 | 17.3 | 5.1 |
| 656 | 11.3 | 2.4 |

From the foregoing a grid can be obtained wherein the temperature necessary to obtain any desired Shear Stress (or weight average molecular weight) and/or Swell (molecular weight distribution) can be obtained for modifying the conditions in the extruder so as to continuously obtain product having the desired characteristics.

The nature and objects of the present invention having been completely described and illustrated, what we wish to claim as new and useful and secure by Letters of Patent is:

1. A system for the controlled scission of polypropylene which comprises:
   an extruder-reactor for heating polypropylene admixed with oxygen to a controlled temperature under shear which includes a zone for admixing oxygen with said polypropylene, a heating zone maintained at metal temperatures within the range of 600° to 1000° F., and a cooling zone which includes a die through which the polypropylene is extruded;
   sampling means for sampling a portion of said polypropylene after mixing and heating for measuring a parameter of molecular weight; and
   feedback means for changing the temperature in said heating zone of said extruder-reactor in response to the parameter of molecular weight measured.

2. A system according to claim 1 wherein said sampling means comprises a pelletizer and a continuous rheometer which measures the parameter of molecular weight of the pelletized polypropylene.

3. A system according to claim 1 which includes a water bath wherein the extruded polypropylene is cooled and said sampling means includes a pelletizer for forming said extruded polypropylene into pellets, means for passing a portion of said polypropylene pellets to a continuous rheometer and a continuous rheometer for measuring the parameter of molecular weight for the pelletized polypropylene.

4. A system according to claim 3 where said pelletizer is outside said water bath.

5. A system according to claim 3 wherein said pelletizer is inside said water bath.

References Cited

UNITED STATES PATENTS

| | | | |
|---|---|---|---|
| 2,747,224 | 5/1956 | Koch et al. | 18—2IX |
| 2,820,987 | 1/1958 | Bunch | 18—2IX |
| 2,916,792 | 12/1959 | Crook et al. | 18—2IX |
| 3,015,129 | 1/1962 | Hays et al. | 18—2IX |
| 3,111,707 | 11/1963 | Buckley | 18—2I |
| 3,252,320 | 5/1966 | Welty | 18—2I |
| 3,288,895 | 11/1966 | Windeler | 18—2IX |
| 3,438,088 | 4/1969 | Westbrook | 18—2IX |
| 3,454,221 | 8/1969 | Emich | 18—2IX |
| 3,454,501 | 11/1969 | Bachman et al. | 18—21 |
| 2,156,895 | 5/1939 | Godat | 18—2I |
| 2,540,146 | 2/1951 | Stober | 18—21UX |
| 3,017,662 | 1/1962 | Marsh | 18—2IX |
| 3,111,707 | 11/1963 | Buckley | 18—2I |
| 3,270,553 | 9/1966 | Ballman et al. | 18—12PX |
| 3,278,988 | 10/1966 | Hannis | 18—12M |

WILLIAM S. LAWSON, Primary Examiner

U.S. Cl. X.R.

18—12